United States Patent
Fujimoto et al.

(10) Patent No.: US 9,764,371 B2
(45) Date of Patent: Sep. 19, 2017

(54) METHOD AND DEVICE FOR CAULKING A CAULKING MEMBER

(71) Applicant: AOYAMA SEISAKUSHO CO., LTD., Niwa-Gun (JP)

(72) Inventors: Yukinori Fujimoto, Niwa-Gun (JP); Tsuyoshi Kojima, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 425 days.

(21) Appl. No.: 14/073,250

(22) Filed: Nov. 6, 2013

(65) Prior Publication Data

US 2014/0060136 A1 Mar. 6, 2014

Related U.S. Application Data

(63) Continuation of application No. PCT/JP2012/062600, filed on May 17, 2012.

(30) Foreign Application Priority Data

Jun. 2, 2011 (JP) .................................. 2011-123956

(51) Int. Cl.
*B21D 31/00* (2006.01)
*B21D 53/24* (2006.01)
(Continued)

(52) U.S. Cl.
CPC .............. *B21D 31/00* (2013.01); *B21D 53/24* (2013.01); *B23P 19/064* (2013.01); *F16B 37/068* (2013.01)

(58) Field of Classification Search
CPC ......... B23P 11/005; B23P 19/02; B23P 19/06; Y10T 29/49943; Y10T 29/49936;
(Continued)

(56) References Cited

U.S. PATENT DOCUMENTS 5,479,687 A * 1/1996 Sawdon ............... B21D 39/031
29/243.5
5,884,386 A * 3/1999 Blacket ............... B21D 39/031
29/432.2
(Continued)

FOREIGN PATENT DOCUMENTS

CN 1078672 A 11/1993
CN 1 712 744 A 12/2005
(Continued)

OTHER PUBLICATIONS

DE 10226668 A1; Date Dec. 2003; Country DE; Name Wandtke Juergen; Abstract, Figures translation through East.*
(Continued)

*Primary Examiner* — David Bryant
*Assistant Examiner* — Lawrence Averick
(74) *Attorney, Agent, or Firm* — Burr & Brown, PLLC

(57) ABSTRACT

The invention is directed to a method for caulking a caulking member such as a caulking nut or a caulking bolt to a metal plate. The metal plate is arranged on a die having a caulking protrusion formed on an end surface thereof, the caulking member is arranged on the metal plate while a position of a caulking recess portion of the caulking member is aligned with the caulking protrusion, and a punch is brought closer to the die so that the caulking member is pressed against the metal plate. While an upper surface of the metal plate in a position opposite to the caulking recess portion is restricted by a downward protruding portion of the punch or by the caulking member, the metal plate is plastically fluidized into the caulking recess portion, so that the caulking member is caulked without boring a hole in the metal plate.

3 Claims, 8 Drawing Sheets

(51) Int. Cl.
*F16B 37/06* (2006.01)
*B23P 19/06* (2006.01)

(58) Field of Classification Search
CPC .......... Y10T 29/49938; Y10T 29/49956; B21J
15/00; B21J 15/022; B21J 15/025; B21J
15/027; B21J 15/04; B21J 15/041; B21J
15/043; B21J 15/045; B21J 15/046; B21J
15/048; B21J 15/06; B21J 15/08; B21D
39/03; B21D 39/00; B21K 1/00; F16B
19/04; F16B 37/06; F16B 37/04
See application file for complete search history.

(56) References Cited

U.S. PATENT DOCUMENTS

| | | | |
|---|---|---|---|
| 6,004,087 | A | 12/1999 | Müller |
| 6,146,072 | A | 11/2000 | Müller |
| 6,257,814 | B1 | 7/2001 | Müller |
| 6,604,900 | B2 * | 8/2003 | Ikami .................. F16B 37/068 411/181 |
| 6,961,986 | B1 * | 11/2005 | Muller .................. B21D 39/06 29/283.5 |
| 6,994,486 | B1 | 2/2006 | Babej |

FOREIGN PATENT DOCUMENTS

| | | | |
|---|---|---|---|
| DE | 102 26 668 | A1 | 12/2003 |
| DE | 10226668 | A1 * 12/2003 | ........... B21D 39/032 |
| JP | 06-037886 | B2 | 5/1994 |
| JP | 10-213108 | A1 | 8/1998 |
| JP | 2969163 | B2 | 11/1999 |
| JP | 2003-504569 | | 2/2003 |
| JP | 2008-093700 | A1 | 4/2008 |
| WO | 93/10925 | A1 | 6/1993 |

OTHER PUBLICATIONS

English language translation of DE 10226668 A1, published Dec. 24, 2003.*
Extended European Search Report (Application No. 12792250.8) dated Oct. 6, 2014.
International Search Report dated Aug. 21, 2012.
Chinese Office Action (Application No. 201280026943.0) dated Nov. 17, 2014.
Chinese Office Action (Application No. 201280026943.0) dated Dec. 3, 2015.

* cited by examiner

METHOD AND DEVICE FOR CAULKING A CAULKING MEMBER

BACKGROUND OF THE INVENTION

Field of the Invention

The present invention relates to a method and a device for caulking a caulking member such as a caulking (swaging) nut or a caulking bolt to a metal plate.

Description of Related Art

As shown in Patent documents 1 and 2, conventionally, a caulking nut to be caulked and fixed to a metal plate has been known. The caulking nut is fixed to the metal plate by boring a hole by a punch in the metal plate and plastically flowing the metal in a periphery of the hole into a caulking recess portion. The caulking nut has an advantage in which it requires a cost lower than that for fixing the nut to a metal plate by welding. It also has an advantage that no welding heat and spatter are caused.

CONVENTIONAL TECHNIQUE DOCUMENT

Patent Document

Patent document 1: JP 06-037886 B
Patent document 2: JP 2969163 B

SUMMARY OF THE INVENTION

However, both the caulking nuts described in Patent documents 1 and 2 are fixed to the metal plate by boring a hole in the metal plate. Accordingly, the caulking nut cannot be used for a product that does not allow any holes to be opened such as a product requiring water tightness, oil tightness, or air tightness, and therefore the nut is welded to the metal plate conventionally.

An object of the present invention is to solve the foregoing problem, and provide a method and a device for caulking a caulking member such as a caulking nut to a metal plate without opening a hole in the metal plate.

To solve the problem described above, the invention set forth in [1] is directed to a caulking method for caulking a caulking member having a caulking recess portion formed therein to a metal plate, the method including:

using a device for caulking that includes a die with a caulking protrusion formed at an end surface thereof and having a diameter smaller than a diameter of the caulking recess portion, and a punch arranged to be opposite to the die and to be capable of approaching to and separating from the die;

placing the metal plate on the die, and arranging the caulking member on the metal plate by aligning a position of the caulking recess portion with the caulking protrusion;

pressing the caulking member against the metal plate by bringing the punch closer to the die; and restricting an upper surface of the metal plate in a position opposite to the caulking recess portion by a downward protruding portion of the punch or by the caulking member, plastically flowing the metal plate into the caulking recess portion, and caulking the caulking member to the metal plate without boring the metal plate.

The invention set forth in [2] is directed to the caulking method for caulking a caulking member according to [1], wherein the caulking member is a caulking nut having a threaded hole formed therein and the caulking recess portion communicating with the threaded hole, the punch is formed of a pressing portion, and a downward protruding portion which is formed to have a cylindrical shape, and protrudes from an end portion of the pressing portion and has a front end thereof opposite to the caulking protrusion, and when the nut is caulked, the downward protruding portion is inserted into the threaded hole, the metal plate in a position opposite to the caulking recess portion is plastically fluidized into the caulking recess portion by being sandwiched between the caulking protrusion and the downward protruding portion.

To solve the problem described above, the invention set forth in [3] is directed to the caulking method for caulking a caulking member, wherein the caulking member is a caulking bolt having a head portion in which a caulking recess portion is formed, the punch has a pressing surface for pressing the head portion of the caulking bolt at a lower end surface thereof, and a shaft holding recess portion into which a shaft portion of the caulking bolt is inserted is formed in a center of the pressing surface, and when the caulking bolt is caulked, the shaft portion of the caulking bolt is inserted into the shaft holding recess portion, the metal plate in a position opposite to the caulking recess portion is plastically fluidized into the caulking recess portion by being sandwiched between the caulking protrusion and a bottom surface of the caulking member.

The invention set forth in [4] is directed to a device for caulking a caulking member having a caulking recess portion formed therein to a metal plate, the device comprising:

a die; and a punch which is arranged to be opposite to the die and to be capable of approaching to and separating from the die, wherein a caulking protrusion having a diameter smaller than that of the caulking recess portion is formed in an end surface of the die, and a downward protruding portion for restricting an upper surface of the metal plate is formed in the punch.

The invention set forth in [5] is directed to a device for caulking a caulking member having a caulking recess portion formed therein to a metal plate, the device comprising:

a die; and a punch which is arranged to be opposite to the die and to be capable of approaching to and separating from the die, wherein a caulking protrusion having a diameter smaller than that of the caulking recess portion is formed in an end surface of the die, and a pressing surface for pressing a head portion of a caulking bolt into which a shaft portion of the caulking bolt is inserted and a shaft portion holding recess portion positioned in a center thereof are formed in the punch.

According to the present invention, by bringing the punch closer to the die on which the metal plate is placed, the caulking member is pressed against the metal plate, and while an upper surface of the metal plate in a position opposite to the caulking recess portion is restricted by the downward protruding portion of the punch or by the caulking member, the metal plate is plastically fluidized into the caulking recess portion. In this way, since caulking is performed by restricting the upper surface of the metal plate by the downward protruding portion of the punch or by the caulking member, it is possible to caulk the caulking member to the metal plate without boring a hole in the metal plate.

BRIEF DESCRIPTION OF THE DRAWINGS

FIG. 2(A) is a partial cross sectional view, and FIG. 2(B) is a bottom view.

DETAILED DESCRIPTION OF THE INVENTION (Description of a Caulking Nut)

Hereinafter, preferred embodiments of the present invention will be described with reference to the drawings.

Figure 1:
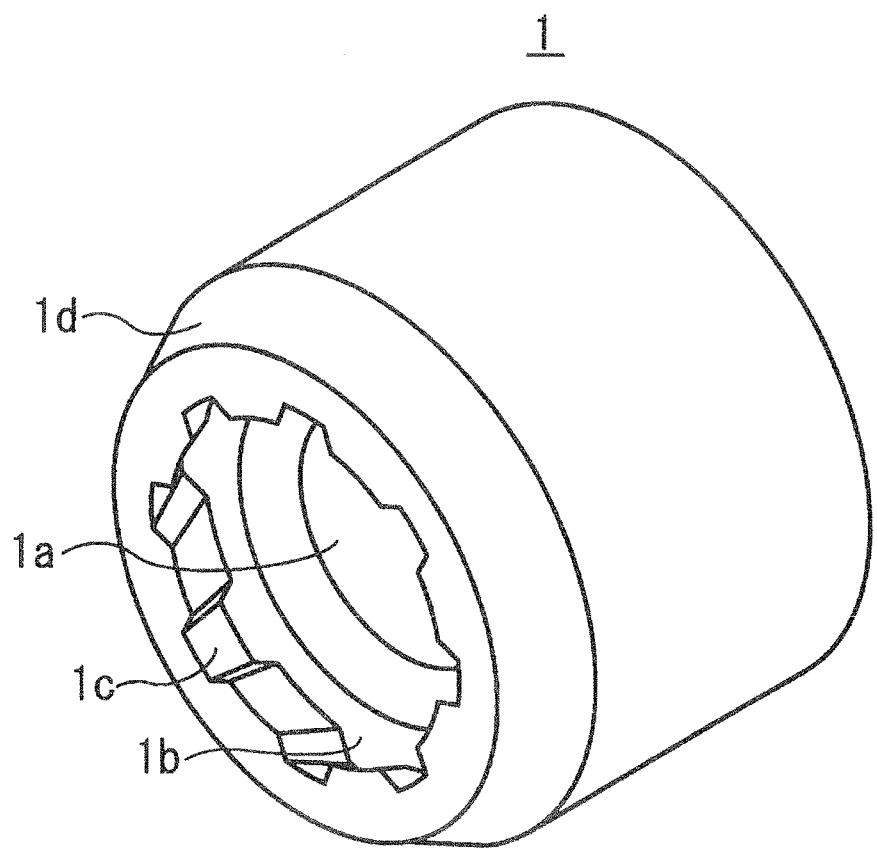
FIG. 1 is a perspective view of a caulking nut used in the present invention.
Figure 2:
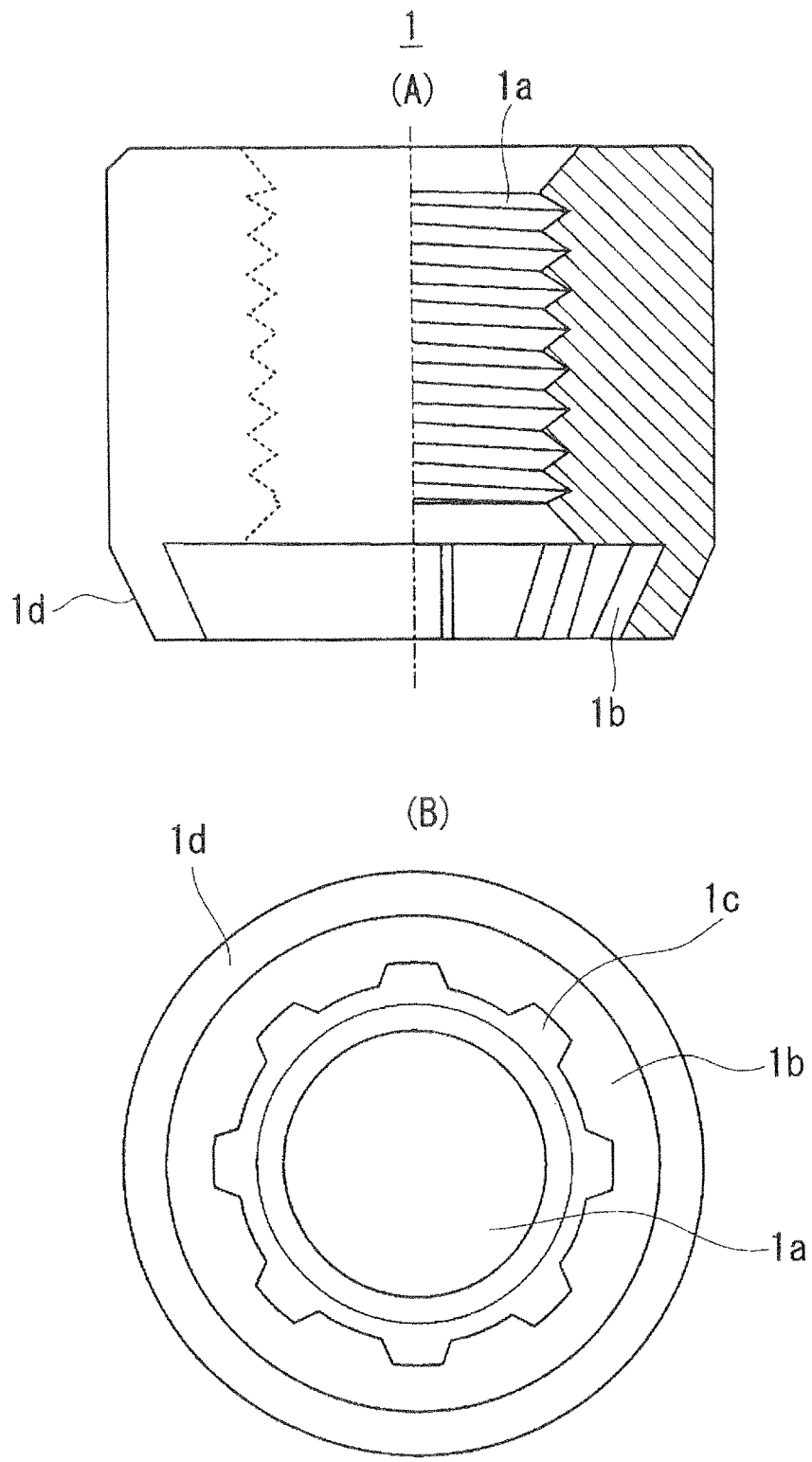
FIGS. 2(A) and 2(B) are entire views of the caulking nut used in the present invention.

First, a caulking nut which is a typical example of a caulking member used in the present invention will be described with reference to FIG. 1 and FIGS. 2(A) and 2(B). As illustrated in these drawings, a caulking recess portion 1b which communicates with one end portion of a threaded hole 1a penetrating in an axial direction is formed at one end of a caulking nut 1. The caulking recess portion 1b is formed larger than an inner diameter of the threaded hole 1a. As illustrated in FIG. 2(A), the caulking recess portion 1b is formed to have an inner diameter which is larger on a deeper side than at a lower end surface. This kind of shape is formed by forming a tapered portion 1d by cold-forging a lower end portion after the threaded hole 1a and the caulking recess portion 1b are formed. Each of serrations 1c including a recess portion that swells outwardly at a constant angle is formed in a circumferential direction in the caulking recess portion 1b, as shown in FIG. 2(B). According to this embodiment, although the caulking nut 1 has a cylindrical shape, it may be formed into a polygonal columnar shape such as a hexagonal columnar shape.

(Description of a Device for Caulking a Caulking Nut)

Figure 3:
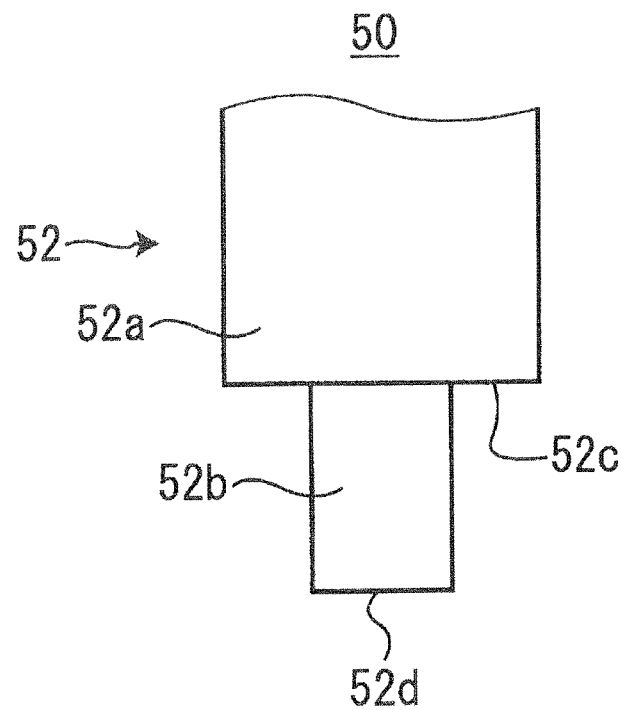
FIG. 3 is a descriptive diagram illustrating an embodiment of a device for caulking the caulking nut.
Figure 3:
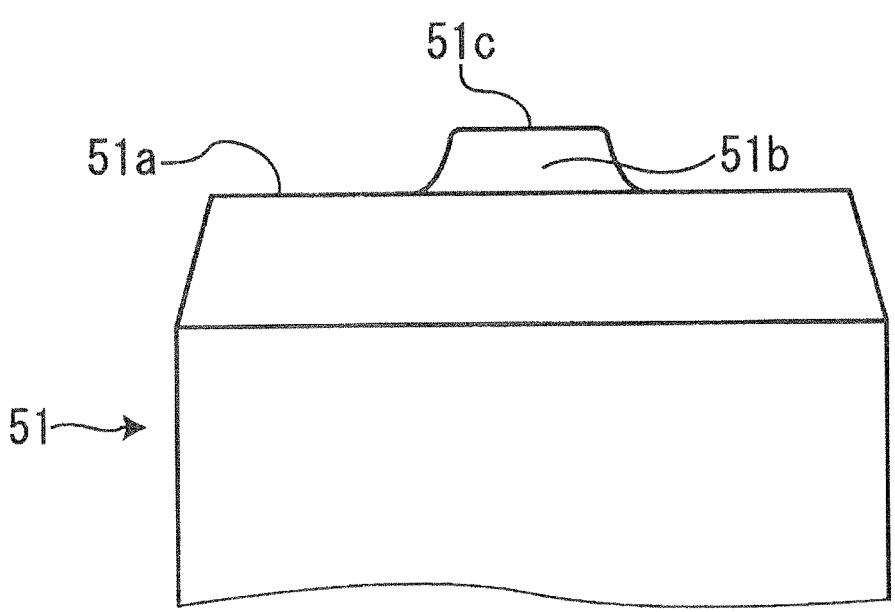

Hereinafter, a device 50 for caulking a caulking nut will be described with reference to FIG. 3. The device 50 for caulking the caulking nut according to the present invention is structured of a die 51, and a punch 52 that is arranged to be opposite to the die 51 and to be capable of approaching to and separating from the die 51, According to this embodiment, the die 51 has a substantially cylindrical shape, and a metal plate holding surface 51a which is flat is formed at an upper end thereof. A caulking protrusion 51b is formed on the metal plate holding surface 51a of the die 51. According to this embodiment, the caulking protrusion 51b has a substantially circular cone trapezoid shape. A first clamping surface 51c which is a flat surface in parallel with the metal plate holding surface 51a is formed at an upper end of the caulking protrusion 51h. The caulking protrusion 51b may be formed in a polygonal pyramid shape, a cylindrical shape, a polygonal columnar shape, or a doughnut shape.

The punch 52 is structured of a pressing portion 52a formed in a base portion (upper portion) thereof, and a downward protruding portion 52b protruding downward from a lower end of the pressing portion 52a. The downward protruding portion 52b has an outer diameter smaller than that of the pressing portion 52a, and has a cylindrical shape having the outer diameter slightly smaller than an inner diameter of the threaded hole 1a of the caulking nut 1. In this embodiment, although the pressing portion 52a has a cylindrical shape having an outer diameter larger than that of the downward protruding portion 52b, the shape thereof may be formed in a quadratic prism shape or a hexagonal prism shape. A lower end surface of the pressing portion 52a is formed as a nut pressing portion 52c which is flat. A second clamping surface 52d which is parallel to the nut pressing portion 52c is formed at a lower end of the downward protruding portion 52b. The first clamping surface 51c and the second clamping surface 52d are arranged to be opposite to each other and to be capable of approaching to and separating from each other.

(Description of a Method for Caulking a Caulking Nut Using a Device for Caulking the Caulking Nut)

Figure 4:
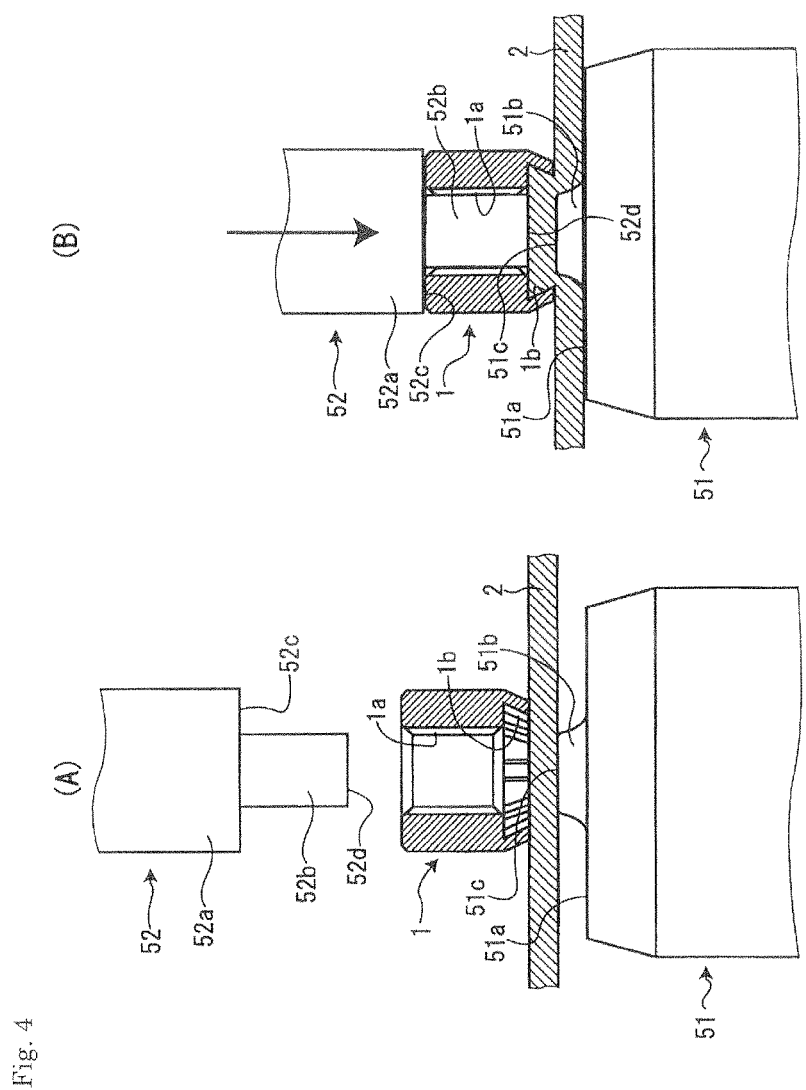
FIGS. 4(A) and 4(B) are descriptive diagrams illustrating a method for caulking the caulking nut.

Hereinafter, a method for caulking the caulking nut 1 will be described with reference to FIGS. 4(A) and 4(B). As illustrated in FIG. 4(A), a metal plate 2 is disposed above the metal plate holding surface 51a of the die 51 (i.e., on the caulking protrusion 51b), and further the caulking nut 1 is disposed on the metal plate 2 in a position immediately above the caulking protrusion 51b. To state it differently, a position of the caulking recess portion 1b in a horizontal direction is aligned with the caulking protrusion 51b, and the caulking nut 1 is arranged on the metal plate 2.

As illustrated in FIG. 4(B), when the punch 52 is brought closer to the die in this state, the downward protruding portion 52b of the punch 52 is inserted into the threaded hole 1a of the caulking nut 1, and the nut pressing portion 52c of the pressing portion 52a presses an upper end of the caulking nut 1. Then, the metal plate 2 located in a position opposite to the caulking recess portion 1b is pressed by the caulking protrusion 51b and plastically fluidized into the caulking recess portion 1b. However, since the downward protruding portion 52b advances to a lower end position of the threaded hole 1a, the metal plastically fluidized by being pressed by the caulking protrusion 51b has an upper surface thereof which is restricted, has nowhere to move upwardly, and is reliably filled in the caulking recess portion 1b. To state it differently, when the caulking nut 1 is caulked to the metal plate 2, the metal plate 2 in a position opposite to the threaded hole 1a of the caulking nut 1 is sandwiched between the caulking protrusion 51b and the downward protruding portion 52b and is plastically fluidized into the caulking recess portion 1b. Then, the caulking nut 1 is caulked to the metal plate 2. The metal in a position opposite to the caulking recess portion 1b is also filled into each of the serration portion 1c.

According to the present invention, the first clamping surface 51c and the second clamping surface 52d are flat surfaces and are separated from each other with a predetermined distance therebetween when they are caulked. Accordingly, when the caulking nut 1 is caulked to the metal plate 2, a hole is not bored in the metal plate 2.

As illustrated in FIG. 4(B), the caulking recess portion 1b is formed larger on a deeper side than on an opening side, the metal of the metal plate 2 is filled by plastic flow into the caulking recess portion 1b, and therefore the caulking nut 1 does not come off the metal plate 2. Further, according to this embodiment, since the serration portions is are formed in the caulking recess portion 1b, even in the case where a force is exerted on the caulking nut 1 in a circumferential direction, the metal of the metal plate 2 filled into positions of the serration portions 1c serves as a resistance, and therefore the caulking nut 1 does not rotate relative to the metal plate 2.

According to the device 50 for caulking the caulking nut described above, although it has a structure in which the punch 52 is arranged above the die 51 which is arranged on a lower side, turning them upside down for use is, of course, possible.

(Description of a Caulking Bolt)

Figure 5:
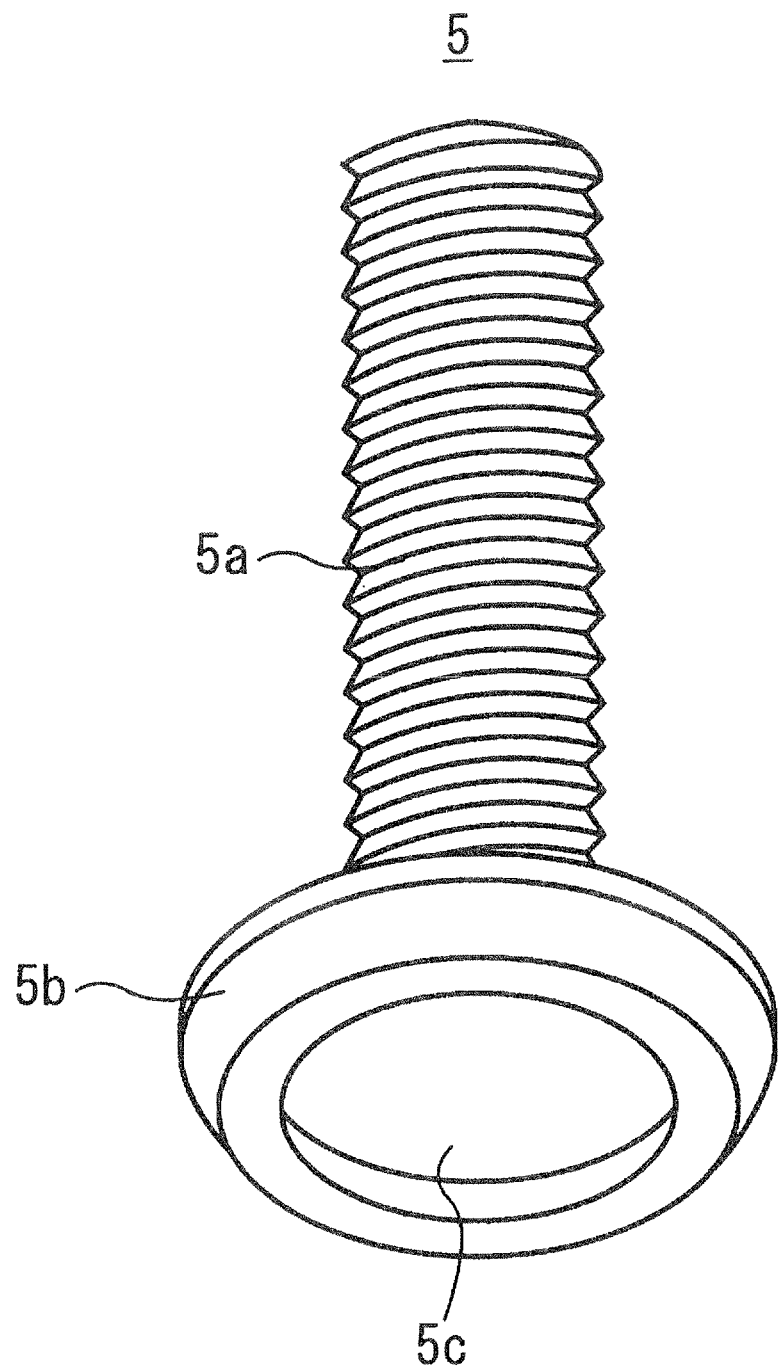
FIG. 5 is a perspective view of a caulking bolt.
Figure 6:
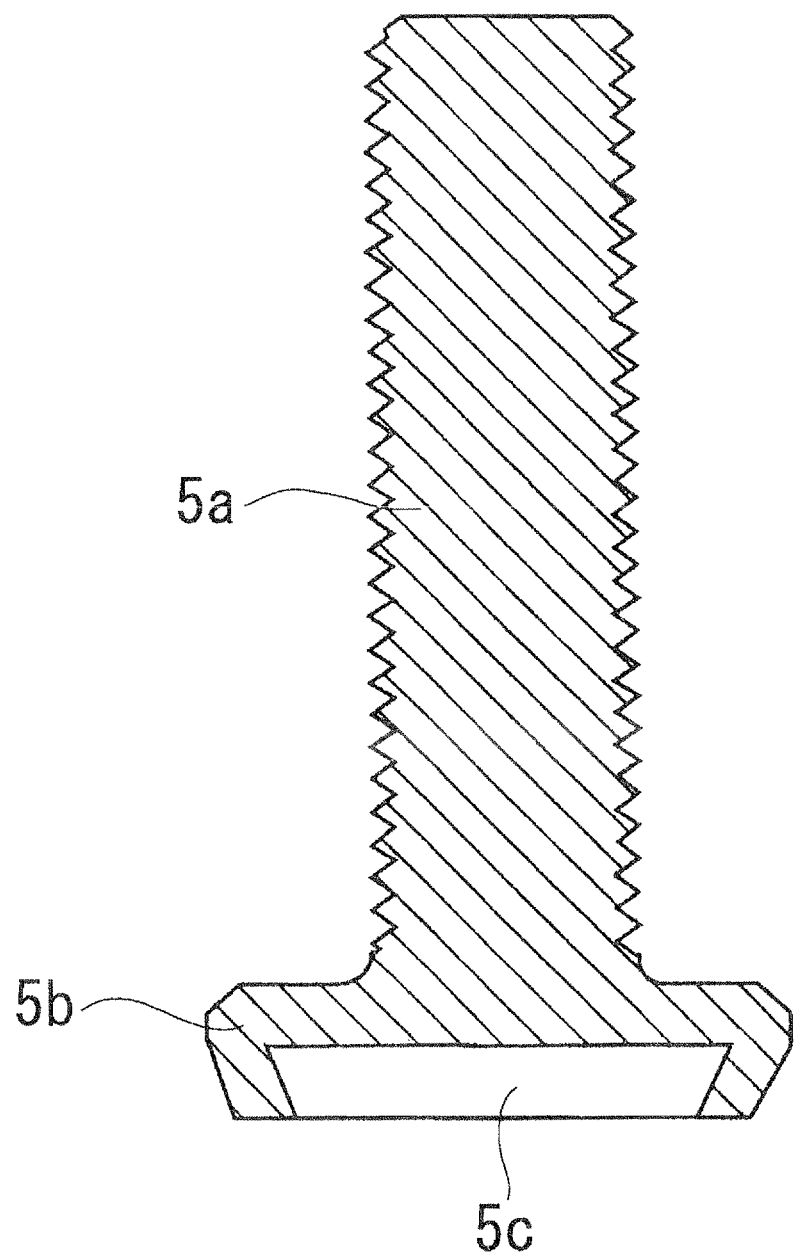
FIG. 6 is a cross sectional view of the caulking bolt.

Next, a caulking bolt 5 which is a typical example of a caulking member used in the present invention will be described with reference to FIGS. 5 and 6.

The caulking bolt 5 is a bolt in which a head portion 5b is formed at one end of a shaft portion 5a in which a threaded groove is threaded, and a caulking recess portion 5c is formed so as to make a recess in the head portion 5b. The caulking recess portion 5c has an inner diameter which is larger on a deeper side than at an opening end. Serrations may be formed in the caulking recess portion 5c. The shaft 5a may have a shape of pin having no threaded groove. In addition, the shaft portion 5a may include either a case of solid or a case of hollow.

(Description of a Device for Caulking a Caulking Bolt)

Figure 7:
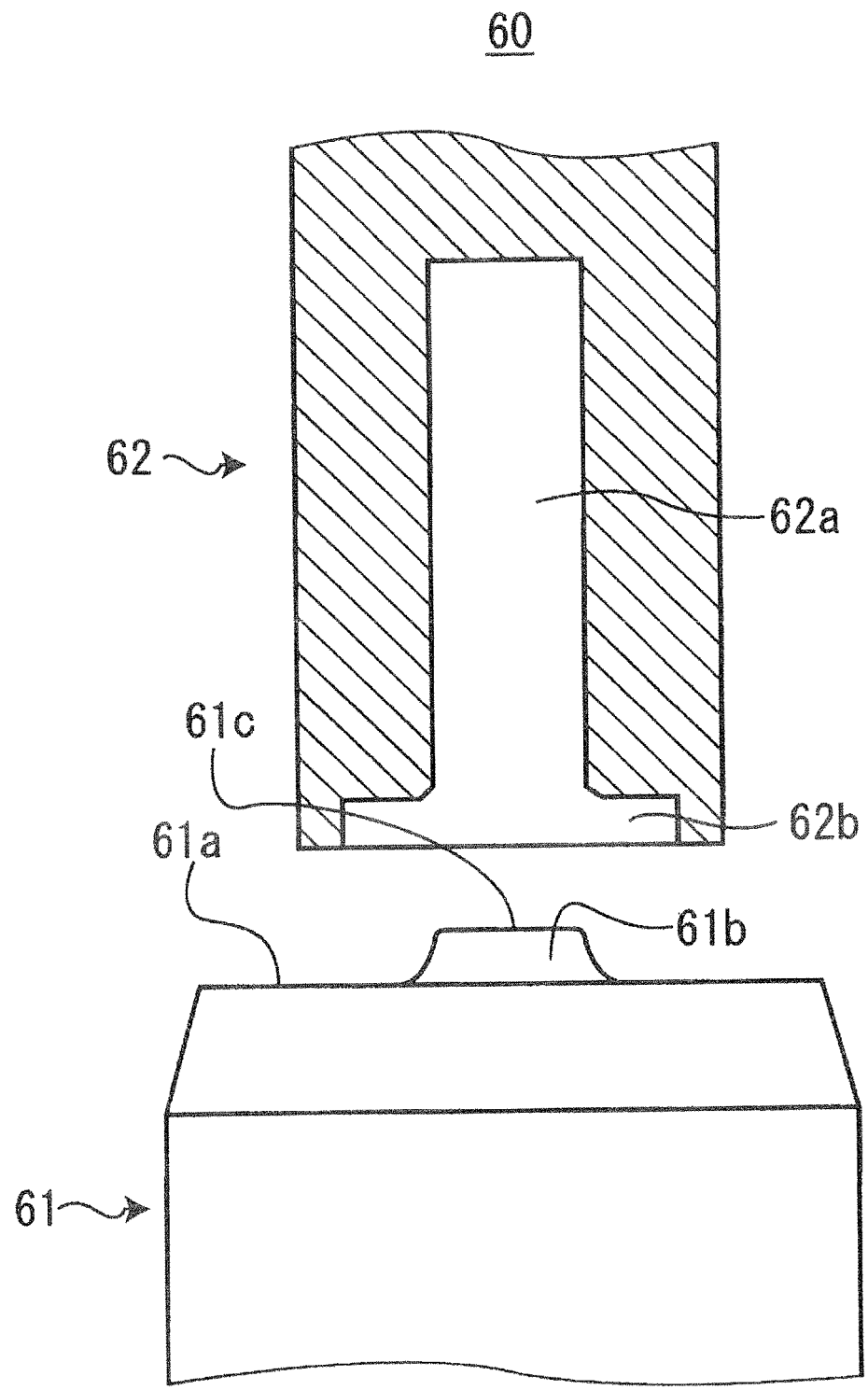
FIG. 7 is a descriptive diagram illustrating an embodiment of a device for caulking the caulking bolt.

Hereinafter, a device 60 for caulking the caulking bolt will be described with reference to FIG. 7. The device 60 for caulking the caulking bolt is structured of a die 61, and a punch 62 that is arranged to be opposite to the die 61 and to be capable of approaching to and separating from the die 61.

The die 61 has a similar structure as that of the die 51 described above, a metal plate holding surface 61a having a flat surface is formed at an upper end thereof, and a caulking protrusion 61b is formed on the metal plate holding surface 61a. A clamping surface 61c which is a flat surface in parallel with the metal plate holding surface 61a is formed at an upper end of the caulking protrusion 61b.

According to this embodiment, the punch 62 has a cylindrical shape. A shaft portion holding recess portion 62a is formed along a longitudinal axis of the punch 62 and opens at a lower end thereof. An inner diameter of the shaft portion holding recess portion 62a is made slightly larger than an outer diameter of the shall portion 5a of the caulking bolt 5 so that the shaft portion 5a can be inserted into the shaft portion holding recess portion 62a. A head portion holding recess portion 62b is formed in an opening portion of the shaft portion holding recess portion 62a at a lower end of the punch 62. The head portion holding recess portion 62b is made slightly larger than an external shape of the head portion 5b of the caulking bolt 5. The head portion holding recess portion 62b is arranged to be capable of accommodating the head portion 5b. As illustrated in FIG. 7, a center of the caulking protrusion 61b and the axis of the shaft portion holding recess portion 62b are aligned with each other.

(Description of a Method for Caulking the Caulking Bolt Using the Device for Caulking the Caulking Bolt)

Figure 8:
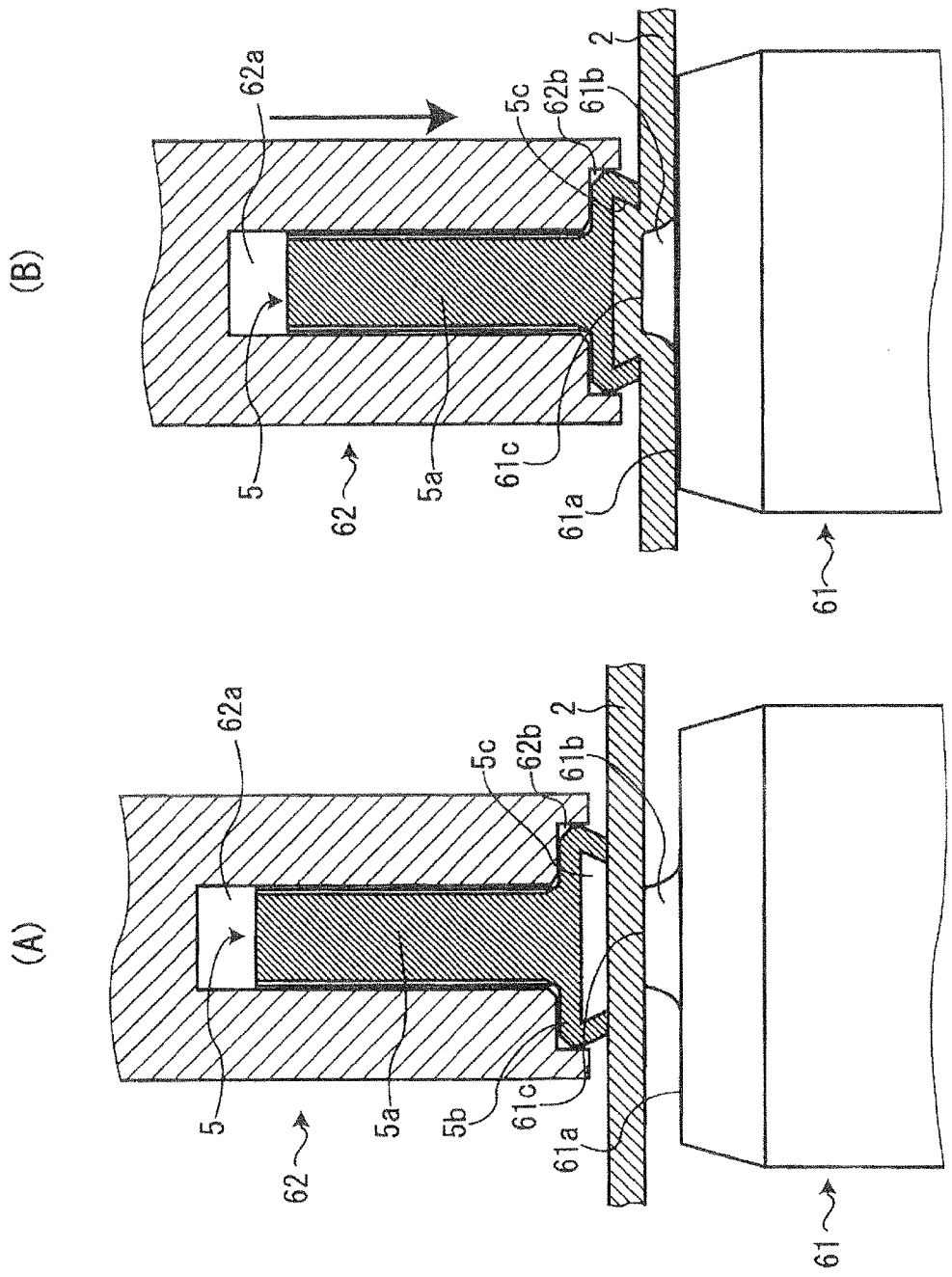
FIGS. 8(A) and 8(B) are descriptive diagrams illustrating a method for caulking the caulking bolt.

Hereinafter, a method for caulking the caulking bolt 5 will be described with reference to FIGS. 8(A) and 8(B). As illustrated in FIG. 8(A), a metal plate 2 is disposed above the metal plate holding surface 61a of the die 61 (i.e., on the caulking protrusion 61b), and further the caulking bolt 5 is disposed on the metal plate 2 in a position immediately above the caulking protrusion 61b. To state it differently, a position of the caulking recess portion 5c in a horizontal direction is aligned with the caulking protrusion 61b, and the caulking bolt 5 is arranged on the metal plate 2.

When the punch 62 is brought closer to the die 61 in this state, the shaft portion 5a is held by being inserted into the shaft portion holding recess portion 62a of the punch 62 (the state illustrated in FIG. 8(A)), and the caulking bolt 5 is pressed against the metal plate 2 while the head portion 5b is held in the head portion holding recess portion 62b. Then, an upper surface of the metal plate 2 in a position opposite to the caulking recess portion 5c is restricted by a bottom surface of the caulking recess portion 5c, and the metal plate 2 is plastically fluidized into the caulking recess portion 5c by being pressed by the caulking protrusion 61b (the state illustrated in FIG. 8(B)).

As illustrated in FIG. 8(B), the caulking recess portion 5c is formed larger on a deeper side thereof than on an opening side thereof, and the metal of the metal 2 is filled into the caulking recess portion 5c by plastic flow. Accordingly, the caulking bolt 5 does not come off the metal plate 2. At the same time, a hole is not bored in the metal plate 2.

The device 60 for caulking the caulking bolt according to the embodiment described above has a structure in which the punch 62 is arranged above the die 61 which is disposed on a lower side. However, it is also possible to provide a structure in which the die 61 is arranged above the punch 62 disposed on a lower side.

DESCRIPTION OF REFERENCE NUMERALS

1 Caulking nut
1a Threaded hole
1b Caulking recess portion
1c Serration
1d Tapered portion
2 Metal plate
5 Caulking bolt
50 Device for caulking caulking nut
51 Die
51a Metal plate holding surface
51b Caulking protrusion
51c First clamping surface
52 Punch
52a Pressing portion
52b Downward protruding portion
52c Nut pressing portion
52d Second clamping surface
60 Device for caulking caulking bolt
61 Die
61a Metal plate holding surface
61b Caulking protrusion
61c Clamping surface
62 Punch
62a Shaft portion holding recess portion
62b Head portion holding recess portion

What is claimed is:

1. A method for caulking a caulking member to a metal plate, the method comprising:
   providing a caulking member in the form of a caulking nut having a threaded hole formed in a body portion of the caulking member and a caulking recess portion communicating with the threaded hole,
   the caulking recess portion having an undercut shape with a first diameter portion at an end of the caulking member and a second enlarged diameter portion disposed within the body portion of the caulking member;
   providing a device for caulking that includes a die with a caulking protrusion formed at an end surface thereof, the entirety of the caulking protrusion having a diameter that is smaller than the first diameter of the caulking recess portion formed in the caulking member, and a punch, which is formed of a pressing portion and a downward protruding portion which is formed to have a cylindrical shape and protrudes from an end portion of the pressing portion and arranged to be opposite to the die and to be capable of approaching to and separating from the die;

placing the metal plate on the die, and arranging the caulking member on the metal plate by aligning a position of the caulking recess portion with the caulking protrusion;

moving the punch toward the die so that the pressing portion of the punch presses the caulking member against the metal plate and the downward protruding portion is inserted into the threaded hole to restrict and sandwich the metal plate between the caulking protrusion and the downward protruding portion during caulking; and pressing the caulking member against the metal plate with the punch to plastically flow a portion of the metal plate through the first diameter portion and outwardly into the enlarged second diameter portion of the caulking recess portion to caulk the caulking member to the metal plate without boring the metal plate.

2. A system for caulking a caulking member to a metal plate, the system comprising:

a caulking member in the form of a caulking nut having a threaded hole formed in a body portion of the caulking member and a caulking recess portion communicating with the threaded hole, the caulking recess portion having an undercut shape with a first diameter portion at an end of the caulking member and a second enlarged diameter portion disposed within the body portion of the caulking member;

a die having a caulking protrusion extending from an upper end surface thereof; and a punch comprising a pressing portion formed at the base of the punch and a downward protruding portion formed to have a cylindrical shape that protrudes from a center area of the pressing portion and has a front end thereof positioned opposite to the caulking protrusion, the punch arranged to be opposite to the die and to be capable of approaching to and separating from the die, wherein the entirety of the caulking protrusion has a diameter that is smaller than the first diameter of the caulking recess portion formed in the caulking member, and in use, the downward protruding portion is inserted into the threaded hole to restrict a metal plate in a position opposite to the caulking recess portion of the caulking member when caulking.

3. The method for caulking a caulking member to a metal plate according to claim 1, wherein the caulking member is caulked to the metal plate without the end of the caulking member penetrating into a surface of the metal plate directly opposite to the end of the caulking member.

* * * * *